US012261403B2

(12) United States Patent
Kelly et al.

(10) Patent No.: US 12,261,403 B2
(45) Date of Patent: Mar. 25, 2025

(54) PROGRAMMABLE MEMORY POSITIONER AND CALIBRATION SYSTEM FOR A CRIMP TOOL AND RELATED METHODS

(71) Applicant: DANIELS MANUFACTURING CORPORATION, Orlando, FL (US)

(72) Inventors: William David Kelly, Orlando, FL (US); Aron Bacs, Jr., Orlando, FL (US); Walt Simmons, Orlando, FL (US)

(73) Assignee: DANIELS MANUFACTURING CORPORATION, Orlando, FL (US)

( * ) Notice: Subject to any disclaimer, the term of this patent is extended or adjusted under 35 U.S.C. 154(b) by 438 days.

(21) Appl. No.: 17/700,787

(22) Filed: Mar. 22, 2022

(65) Prior Publication Data

US 2022/0216662 A1 Jul. 7, 2022

Related U.S. Application Data

(62) Division of application No. 16/391,693, filed on Apr. 23, 2019, now Pat. No. 11,289,866.

(Continued)

(51) Int. Cl.

*H01R 43/048* (2006.01)
*H01R 4/18* (2006.01)
*H01R 43/042* (2006.01)

(52) U.S. Cl.

CPC ......... *H01R 43/0488* (2013.01); *H01R 4/183* (2013.01); *H01R 43/0428* (2013.01)

(58) Field of Classification Search

CPC .............. H01R 43/042; H01R 43/0424; H01R 43/0428; H01R 43/0488; Y10T 29/53065;

(Continued)

(56) References Cited

U.S. PATENT DOCUMENTS 4,974,314 A * 12/1990 Nickerson ............ H01R 43/042 72/461
5,172,737 A * 12/1992 Scruggs .................. G01L 25/00 140/123.5

(Continued)

FOREIGN PATENT DOCUMENTS

DE 19932961 1/2001
DE 19932962 1/2001

(Continued)

OTHER PUBLICATIONS

JP-2007139743-A translation from FIT database (Year: 2024).*

(Continued)

*Primary Examiner* — Aneeta Yodichkas
*Assistant Examiner* — Joshua D Anderson
(74) *Attorney, Agent, or Firm* — ALLEN, DYER ET AL.

(57) ABSTRACT

A crimp tool calibration system for crimping a prepared wire into a corresponding contact wire barrel includes a computer, a positioner having a memory chip storing positioner data, and a tool frame. The tool frame includes a head having a receiving port therethrough, and configured for the positioner to be removably engaged with the receiving port during a crimping operation. The tool frame also includes a plurality of crimping dies positioned around a periphery of the receiving port, an adjustment device to adjust a crimp depth, and a positioner interface coupled to the tool frame. The positioner interface includes a tool memory for storing tool data, a reader, and a transmitter, where the reader is configured to read the positioner data stored on the memory chip or the positioner, and the transmitter is configured to transmit the positioner data and the tool data to the computer.

6 Claims, 14 Drawing Sheets

Related U.S. Application Data

(60) Provisional application No. 62/661,288, filed on Apr. 23, 2018.

(58) Field of Classification Search
CPC ......... Y10T 29/53222; Y10T 29/53226; Y10T 29/53235; G01B 3/26; G01B 3/46; G01B 3/50; G01B 3/52; G01B 7/002; G01B 7/13
See application file for complete search history.

(56) References Cited

U.S. PATENT DOCUMENTS

| | | | |
|---|---|---|---|
| 5,195,042 | A | 3/1993 | Ferraro et al. |
| 5,197,186 | A | 3/1993 | Strong et al. |
| 5,490,406 | A | 2/1996 | College |
| 5,934,137 | A | 8/1999 | Tarpill |
| 6,807,840 | B2 | 10/2004 | Wilhelm et al. |
| 7,059,166 | B2 | 6/2006 | Bowles et al. |
| 7,461,448 | B2 | 12/2008 | Schwartzman et al. |
| 8,079,242 | B2 | 12/2011 | Pacaud et al. |
| 8,613,210 | B2 | 12/2013 | Wagner et al. |
| 9,410,875 | B2 | 8/2016 | Wagner et al. |
| 9,463,556 | B2 | 10/2016 | Lefavour et al. |
| 10,205,294 | B2 | 2/2019 | Broker et al. |
| 10,862,258 | B2 | 12/2020 | Battenfeld et al. |
| 10,958,030 | B2 | 3/2021 | Glockseisen |
| 11,289,866 | B2 | 3/2022 | Kelly et al. |
| 2008/0276678 | A1 | 11/2008 | Pacaud et al. |
| 2012/0314226 | A1 | 12/2012 | Kelly |

FOREIGN PATENT DOCUMENTS

| | | | | |
|---|---|---|---|---|
| DE | 102008030773 | | | 12/2009 |
| EP | 1071173 | | | 1/2001 |
| EP | 1990874 | | | 11/2008 |
| JP | 2007139743 | A | * | 6/2007 |
| JP | 2008164516 | A | * | 7/2008 |

OTHER PUBLICATIONS

JP-2008164516-A translation from FIT database (Year: 2024).*

Daniels Manufacturing Corporation: "AF8 (M22520/1-01) Standard Adjustable Crimp Tool", Aug. 31, 2011 (Aug. 31, 2011), pp. 1-5, XP093111559, Retrieved from the Internet: URL:http://s-motorsport.com/docs/DMC_AF8_M22520_1-01.pdf.

* cited by examiner

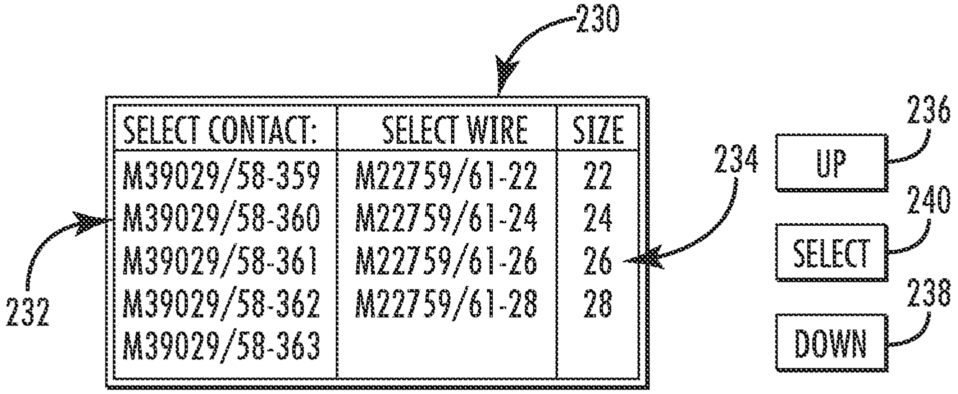
FIG. 14
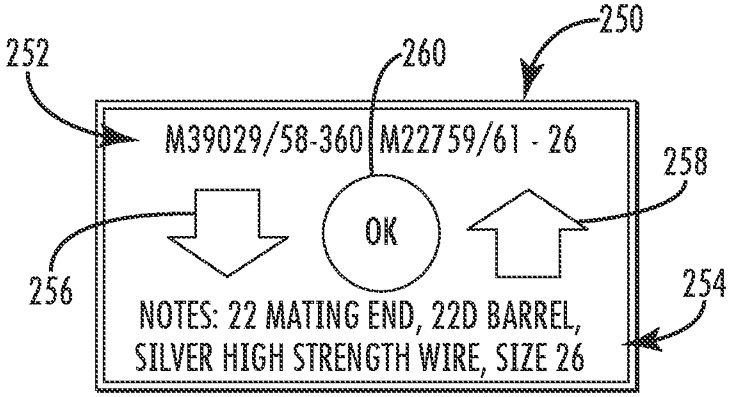
FIG. 15A
243
FIG. 15B

PROGRAMMABLE MEMORY POSITIONER AND CALIBRATION SYSTEM FOR A CRIMP TOOL AND RELATED METHODS

RELATED APPLICATION

This application is a divisional application of U.S. Patent Application Ser. No. 16/391,693, filed Apr. 23, 2019, now U.S. Patent No. 11, 289, 866 issued Mar. 29, 2022, which claims priority to U.S. Provisional Application Ser. No. 62/661,288 filed on Apr. 23, 2018 the contents of which are herein incorporated by reference in their entirety.

TECHNICAL FIELD

The present invention relates to the field of crimping tools, and, more particularly, to a programmable memory positioner and calibration system for a crimp tool and related methods.

BACKGROUND

Contacts as used herein are defined as the termination points in electrical/electronic interconnect systems. When a complex wire harness is constructed, hundreds, perhaps thousands, of contacts are terminated by individually crimping a prepared wire into the contact wire barrel.

A crimp tool for this purpose typically has four crimping elements (indenters or crimping dies) positioned at 90° to each other. The crimping elements advance toward the center of an opening in the tool with a uniform and controlled path when the crimp tool is actuated by closing a handle manually, or actuated using a power source. A typical crimp tool has a built-in stop for single applications, or a multi-step adjustment for multiple wire/contact diameters.

Mechanical crimp tools which are used for aerospace and high reliability applications are equipped with an adjustable device that requires the actuation mechanism which drives the crimping elements to close fully, and then to open fully. That device in mechanical crimp tools is typically referred to as the ratchet. When it controls the motion of the crimping elements in both the closing and opening direction, it is referred to as a two way ratchet. If the motion of the crimping elements is controlled only in the closing direction (acceptable) it is referred to as a one way ratchet.

The design of the crimp tool includes selecting a defined shape to be formed onto the tip of each indenter. A defined stop location is selected for each wire size (diameter) and contact wire barrel diameter/wall thickness, and this information is documented by the contact and tool designers.

In addition, the wire depth/stop settings are usually embossed (labeled) on the crimp tool positioner dataplate. Sometimes the wire material, construction, or plating will change the crimp depth or indenter shape.

One type of crimp tool is referred to as a four (4) plane crimp tool. In the industry, it is often referred to as the 4/8 indent crimp configuration, since it usually has two points on each indenter. An example of a contact 100 crimped to a wire 102 is shown in FIGS. 1 and 2A-2B. The wire barrel 104 is slipped over the prepared wire 102 and the indentors (also referred to herein as crimp dies) form the indentions 106. A cross section of the wire barrel 104 taken in the direction of line B-B is shown in FIG. 28 illustrating the indentions 106 crimped to the wire 102 in four planes.

The stop location of the crimp tool is referred to as the "crimp depth" or the "die closure." The crimp tool is typically set with a go-no/go gage 108 as shown in FIGS. 3 and 4A-48. The gage 108 has a hardened and durable cylindrical pin 110 on the green end 114 referred to as the "go" gage with a diameter that conforms to the minimum crimp depth/die closure. A hardened and durable cylindrical pin 112 is on the other red end 116 of the gage 108 which conforms to the maximum crimp depth/die closure diameter and is commonly referred to as the "no/go" gage.

In order to set the crimp tool to the desired crimp depth, a technician adjusts the crimp tool to a predetermined setting by dialing a selector number, or setting a knob which rotates a screw on the crimp tool. Next, the technician closes the handle of the tool (or actuates a power closing mechanism on pneumatic or electric/hydraulic crimp tools) to the fully closed position. The "go" pin 110 is then inserted between the indenters 118*a*, 118*b* as shown in FIG. 4A. Then the gage 108 is removed and turned around, and the "no/go" pin 112 is inserted into the crimp cavity of the tool as shown in FIG. 4B to attempt to slide between the indentors 118*a*, 118*b*. If the tool is properly calibrated to the desired crimp depth, the "go" pin 110 will enter the crimp cavity, and the "no/go" pin 112 will not enter between the crimp indenters 118*a*, 118*b*.

This gaging procedure for the crimp tool is used to determine whether the crimp tool is acceptable or unacceptable for use on the production line (or maintenance operations) to terminate contacts or terminals. If the "go" pin 110 does not enter the crimp cavity, which is defined by the indenters 118*a*, 118*b*, or the "no/go" pin 112 enters the crimp cavity, the tool is marked not acceptable for production line or maintenance use, and the crimp tool is sent to repair where the crimp tool is examined by trained personnel. A repair may include changing parts and components of the crimp tool, and will typically require adjustment of an internal setting/stop mechanism internal to the crimp tool, which is not accessible without removing sealed covers.

Referring now to FIGS. 5-8, the crimp tool 130 is typically universal within a wire diameter range (#20 to 12 AWG or 0.5 to 3.0 $mm^2$ are typical wire diameter ranges for a common four plane crimp tool). A detachable positioner 120 is a component that adapts the universal crimp tool 130 to one specific application such as one contact configuration, and a designated range of wire diameters, for example. A positioner 120 is shown in FIGS. 5 and 6. A single application may be a family of contacts with differing part numbers, but with common features.

The positioner 120 typically has two functions. The first function is to hold and position the contact in a precise central location (side-to-side, and up/down) in a receiving port 134 to the indenters 118*a*, 118*b*, 118*c*, 118*d*, of the crimp tool 130 as shown in FIGS. 7 and 8. The positioner 120 ensures that the resulting crimp is at the correct location on the contact wire barrel. It also positions the contact centrally to assure that the indents are uniform and concentric around the diameter of the contact wire barrel.

The second function of the positioner 120 is to have a permanent label (i.e., "dataplate") 122 affixed to it. The dataplate 122 displays the compatible contact part numbers 127, and the specified (predetermined) crimp depth settings 126 for each wire size 124 which is allowed to be terminated in that particular contact wire barrel as shown in FIG. 6.

Referring now to FIGS. 7 and 8, when the wire size is selected from the dataplate 122 on the positioner 120, the crimp tool 130 is required to be manually adjusted by some obvious means. The adjustment can be made by a stepped selector knob 132 with a number scale, or a knob affixed to an adjustment screw. The adjustment sets the crimp depth to the setting that was predetermined by the designer for that wire diameter in that particular contact wire barrel.

SUMMARY

In view of the foregoing background, it is therefore an object of the present invention to provide a device that is automatic and operates with precision, and is part of a system to further gather information during the manufacture of wire harnesses, and provide traceability for improving quality of manufacture. This and other objects, features, and advantages in accordance with the present invention are provided by a crimp tool for crimping a prepared wire into a corresponding contact wire barrel. The crimp tool includes a handle, and a head having a receiving port therethrough and the head is coupled to the handle. In addition, the crimp tool includes a plurality of crimping dies positioned around a periphery of the receiving port of the head that are configured to advance towards a center of the receiving port, an adjustment knob having a plurality of depth settings to adjust a crimp depth of the plurality of crimping dies, and a positioning head having a memory chip storing positioner data and the positioning head is removably engaged with the receiving port. The crimp tool also includes a positioner interface removably coupled to the head, and includes a reader configured to read the positioner data stored on the memory chip of the positioning head.

The positioner interface may have a housing and a retainer arm extending away from the housing and ever the positioning head, and the retaining arm has the reader. The positioner interface may also include a tool memory for storing tool data. The tool data may include a number of crimp operations since a last calibration. The positioner interface may also include a transmitter configured to transmit the positioner data read from the memory chip to a computer having a display and input device. In a particular aspect, the positioner interface may include the computer having the display and the input device.

The crimping dies are positioned around the periphery of the receiving port and are actuated when the handle is manually closed. The crimp tool may also include a power closing mechanism to actuate the crimping dies positioned around the periphery of the receiving port.

The computer may be configured to generate a list of a plurality of available contact part numbers and wire sizes corresponding to the positioner data read from the memory chip, and to receive a selected contact part number and a wire size that was selected from the list by a user using the input device.

The computer may also be configured to determine whether the crimping depth of the plurality of crimping dies is currently set to a crimp depth required by the selected contact part number and the wire size, and to generate an indicator to the user to adjust the crimping dies to the required crimp depth when adjustment is required.

The adjustment knob of the crimp tool may be in electrical communication with the positioner interface to indicate the current crimp depth of the plurality of crimping dies. The positioner interface may be configured to transmit the current crimp depth of the plurality of crimping dies to the computer.

In a particular aspect, the crimp tool may include a calibration gage having a gage pin, where the gage pin is configured to slide into the positioner interface for storage and to slide into the receiving port when calibrating the plurality of crimping dies. The gage pin may include a non-conductive core having a plurality of elongated conductive segments thereon and insulated from each other, where each of the plurality of conductive segments are in electrical communication with the positioner interface and configured to transmit a signal when making contact with one of the plurality of crimping dies to determine a position of a respective crimping die.

In another particular aspect, a crimp tool calibration system for crimping a prepared wire into a corresponding contact wire barrel includes a computer having a processor and a memory coupled to the processor, a positioner having a memory chip storing positioner data, and a tool frame. The tool frame includes a head having a receiving port therethrough, where the receiving port has a first end and a second end and configured for the positioner to be removably engaged with the first end of the receiving port during a crimping operation. The tool frame also includes a plurality of crimping dies positioned around a periphery of the receiving port, an adjustment device to adjust a crimp depth of the plurality of crimping dies, and a positioner interface coupled to the tool frame and having a tool memory storing tool data, a reader, and a transmitter. The reader is configured to read the positioner data stored on the memory chip of the positioner, and the transmitter is configured to transmit the positioner data and the tool data to the computer.

In another particular aspect, a method of using and calibrating a crimp tool is disclosed. The crimp tool includes an adjustment; knob having a plurality of depth settings to adjust a crimp depth, a positioning head having a memory chip storing positioner data, and a positioner interface having a reader configured to read the positioner data stored on the memory chip of the positioning head. The method includes transmitting the positioner data read from the memory chip to a computer having a display and input device, generating a list of a plurality of available contact part; numbers and wire sizes corresponding to the positioner data read from the memory chip, and receiving a selected contact part number and a wire size that was selected from the list by a user using the input device. The method also includes determining whether the crimping depth is currently set to a crimp depth required by the selected contact part number and the wire size, and generating an indicator on the display to adjust the tool to the required crimp depth when adjustment is required.

The method may also include sliding a gage pin into a receiving port of the crimp tool, where the gage pin comprises a non-conductive core having a plurality of elongated conductive segments thereon and insulated from each other, and transmitting a signal when making contact with one of the plurality or crimping dies to determine a position of a respective crimping die. The method may include adjusting the crimp depth on the tool to correspond to a calibrated crimp depth. In addition, the method may include transmitting to the computer and storing a contact size and a wire size for each crimping operating, and a number of crimp operations since a last calibration.

BRIEF DESCRIPTION OF THE DRAWINGS

FIG. 14 is a screen shot of a display menu of the crimp tool calibration system of FIG. 12;

FIG. 15A is a screen shot a subsequent display of FIG. 14;

FIG. 15B is a QR code label or display;

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. For example, the invention may be powered manually, electrically, pneumatically, or hydraulically. Rather, these embodiments are provided so that this disclosure will be thorough and complete, and will fully convey the scope of the invention to those skilled in the art. Like numbers refer to like elements throughout.

Currently there is widespread use of mechanical crimp tools and compatible mechanical positioners in wire termination operations. A high level of supervision and manual inspection is required in wire harness production, because incorrect positioners for the contact being used can easily happen. Some common errors include that the crimp tool can inadvertently be adjusted to the incorrect crimp depth setting, the crimp tool calibration can be out of date, and a number of highly manual operator dependent errors can happen.

Figure 1:
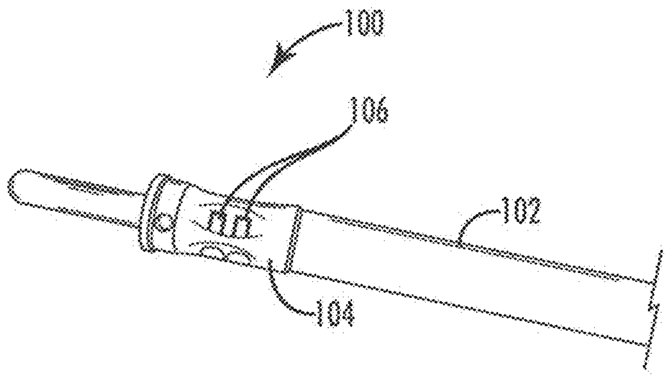
FIG. 1 (PRIOR ART)
FIG. 1 is a schematic of contact crimped to a wire.
Figure 2A:
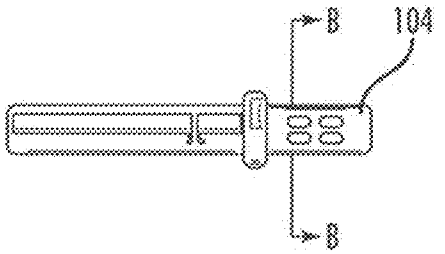
FIG. 2A (PRIOR ART)
FIG. 2A is a schematic of a contact.
Figure 2B:
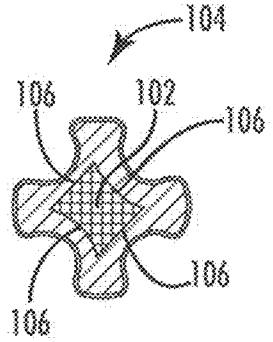
FIG. 2B (PRIOR ART)
FIG. 2B is a schematic of a cross section of the contact taken in the direction of line BB of FIG. 2A.
Figure 3:
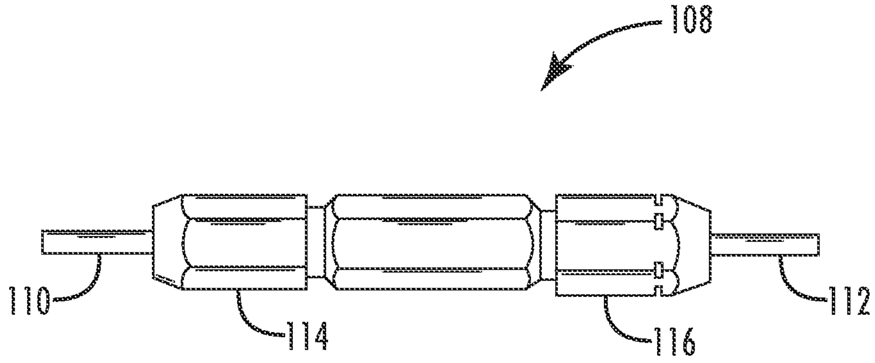
FIG. 3 (PRIOR ART)
FIG. 3 is a schematic of a gage.
Figure 4A:
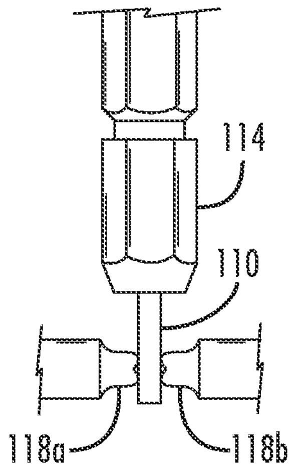
FIG. 4A (PRIOR ART)
FIG. 4A is a detailed view of a first end of the gage of FIG. 3.
Figure 4B:
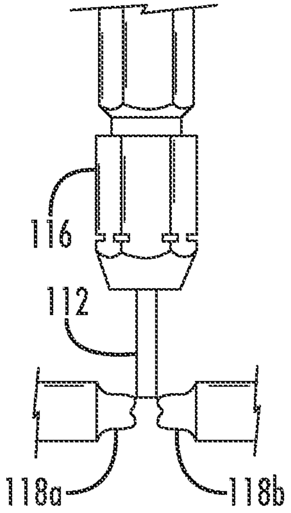
FIG. 4B (PRIOR ART)
FIG. 4B is a detailed view of a second end of the gage of FIG. 3.
Figure 5:
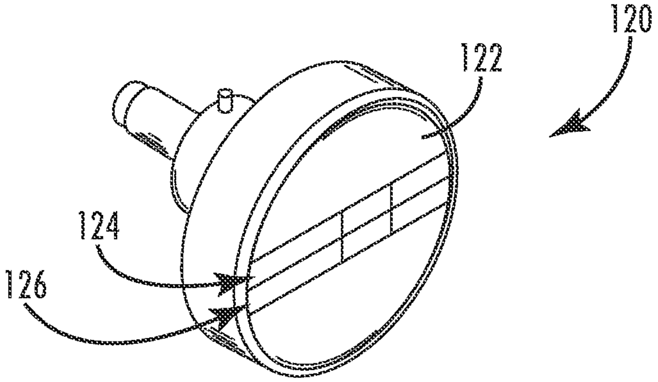
FIG. 5 (PRIOR ART)
FIG. 5 is a perspective view of a positioner.
Figure 6:
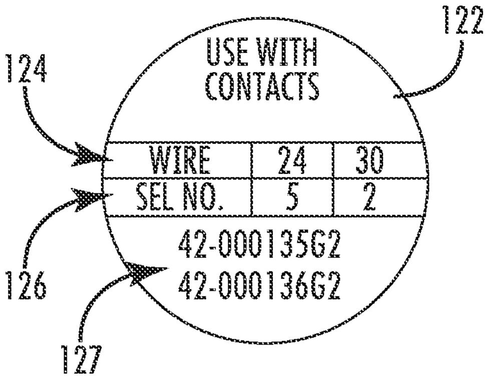
FIG. 6 (PRIOR ART)
FIG. 6 is a schematic of a dataplate of the positioner of FIG. 5.
Figure 7:
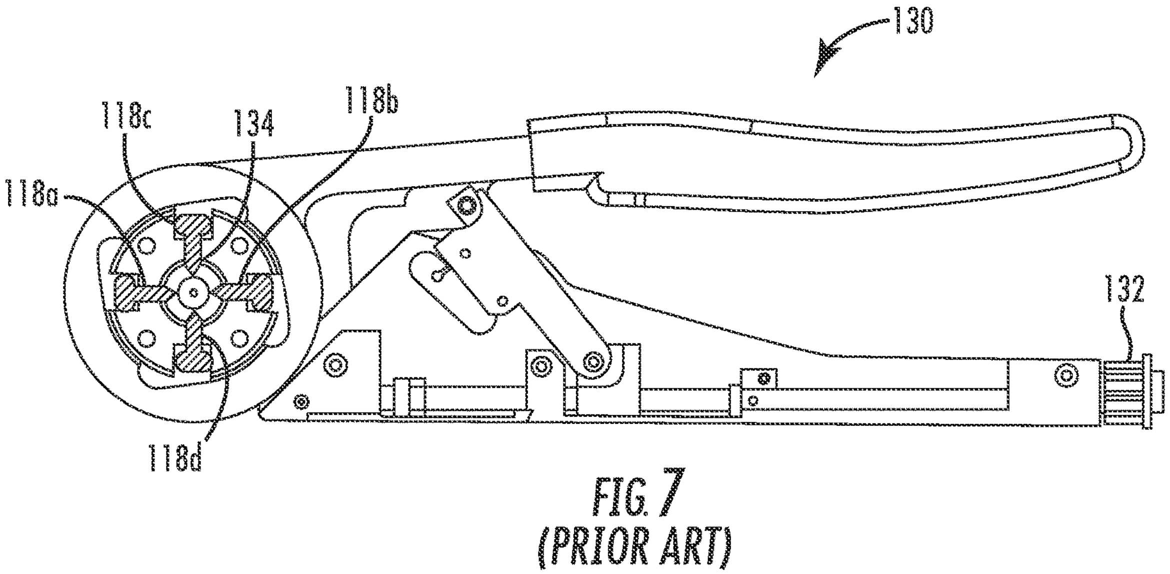
FIG. 7 (PRIOR ART)
FIG. 7 is a longitudinal cross sectional view of a crimp tool.
Figure 8:
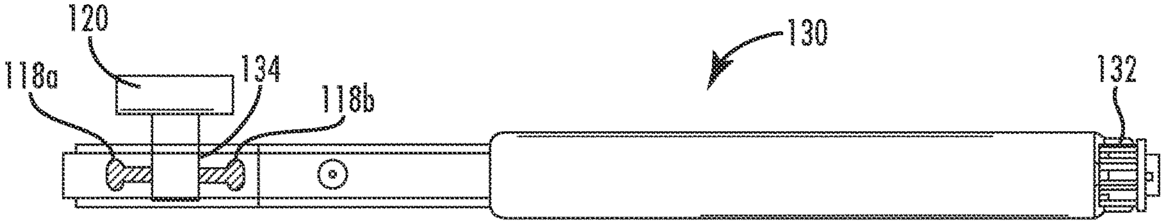
FIG. 8 (PRIOR ART)
FIG. 8 is a top view of the crimp tool of FIG. 7.
Figure 9A:
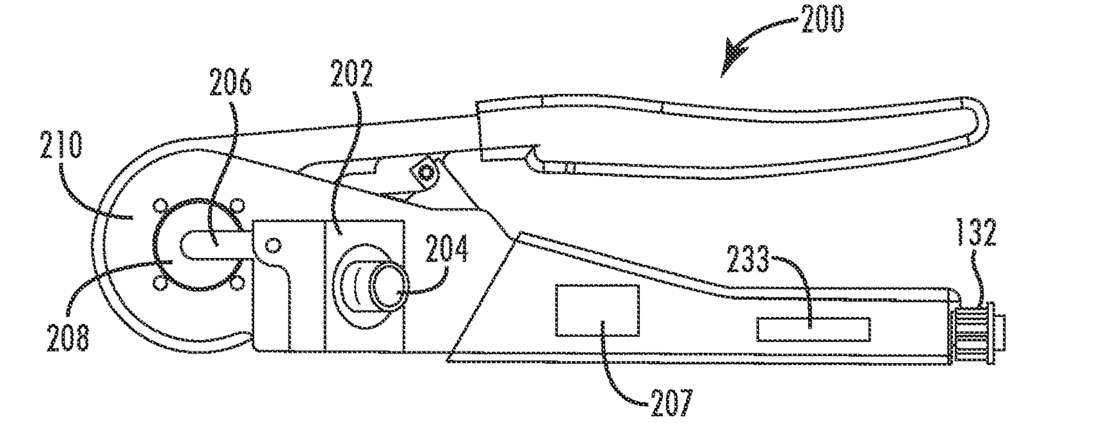
FIG. 9A is an elevational view of a crimp tool in which various aspects of the disclosure may be implemented.
Figure 9B:
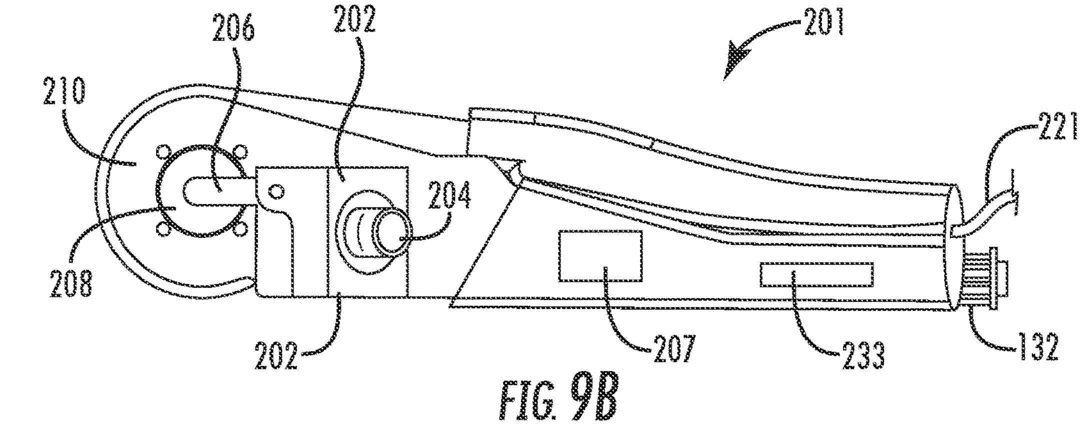
FIG. 9B is an elevational view of a powered crimp tool in which various aspects of the disclosure may be implemented.
Figure 10:
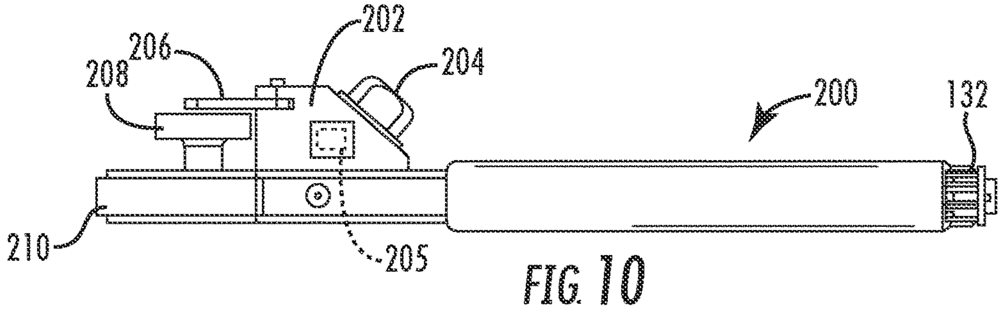
FIG. 10. is a top view of the crimp tool of FIG. 9A.
Figure 11:
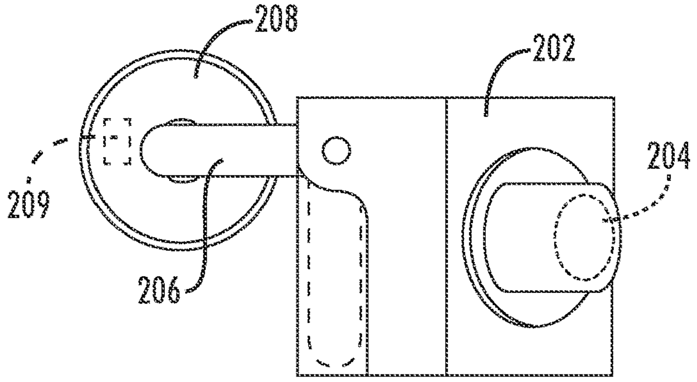
FIG. 11 is a view of the positioner and positioner interface of the crimp tool of FIGS. 9A and 9B.

Referring now to FIGS. 9A-11, a crimp tool 200 and positioner 208 for crimping a prepared wire into a corresponding contact wire barrel, is described herein that would eliminate most manual operations (past the initial setup and directed periodic internal calibration) which is required by typical mechanical crimp tools and positioners. In particular, the positioner 208 is fitted with a memory chip 209 such as a Programmable Read Only Memory chip (PROM), for example, which has the positioner part number programmed into the memory. This allows a database to store and used to retrieve contact part numbers, wire type, size, part number, crimp depth settings, and miscellaneous data/photo files and calibration data programmed and saved in the database to be retrieved and displayed on the controlling computer monitor or tool display 205. The memory chip 209 is readable using a reader 206 of the positioner interface 202 when the positioner 208 is affixed onto the crimp tool 200 as shown in FIGS. 9A, 9B and 10. The positioner interface 202 may be coupled to the positioner 208 using an electrical connector or can be wireless, e.g., RFID wireless signals. FIG. 11 illustrates the positioner 208 being in communication with the positioner interface 202 and without showing the crimp tool 200 for clarity.

Figure 12:
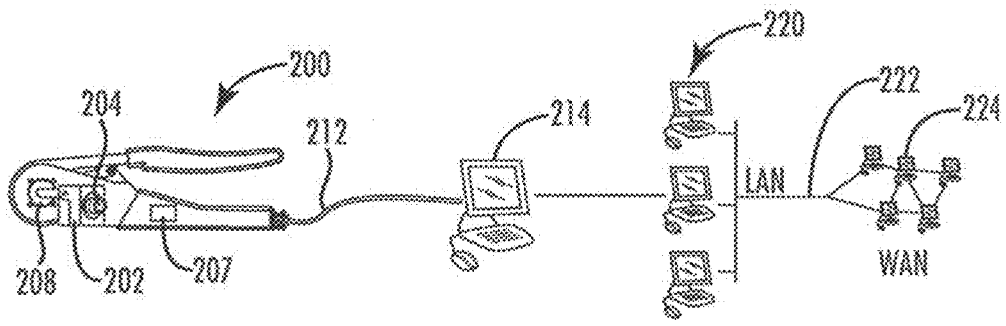
FIG. 12 is a schematic of a crimp tool calibration system in which various aspects of the disclosure may be implemented.
Figure 13A:
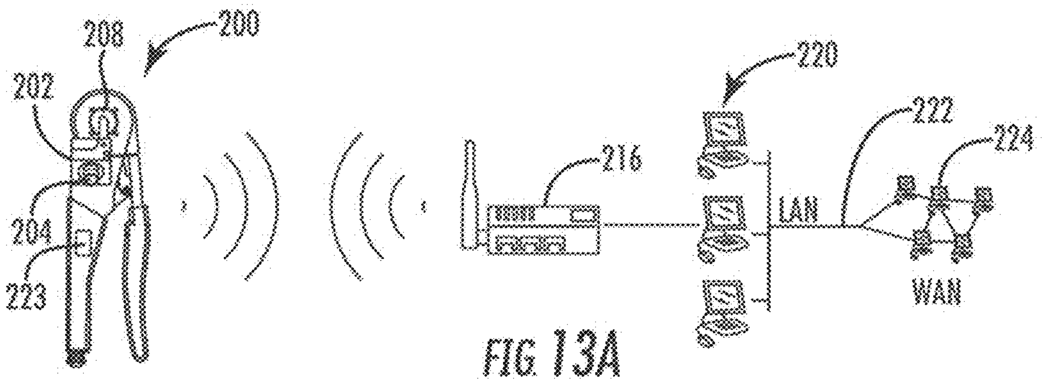
FIG. 13A is a schematic of a crimp tool calibration system of FIG. 12 with a wireless aspect.

When the positioner 208 is installed into the receiving port of the crimp tool head 210, the reader 206 will interface electronically with the memory chip 209 in the positioner 208. This information is communicated to, and interactive with, a controlling network 220 by wireless or wired connection. For example, a transmitter 223 of the crimp toot 200 is configured to transmit the positioner data and the tool data to the controlling computer 214, which may be coupled to a network 220 (as shown in FIGS. 12 and 13A) via LAN 222 and/or WAN 224. Transmission from the crimp tool 200 may be wi-fi, Bluetooth, Zigbee, RFID, for example, using a receiver 216.

This is determined and arranged by screen choices made by the technician during setup operations. The reader 206 may also serve as a latch to hold the positioner 208 in place.

The crimp tool 200 is selected to meet the contact and wire diameter range of the application, and the particular positioner 208 is selected to be compatible with the one contact configuration, or family of contacts all having common characteristics.

Figure 13B:
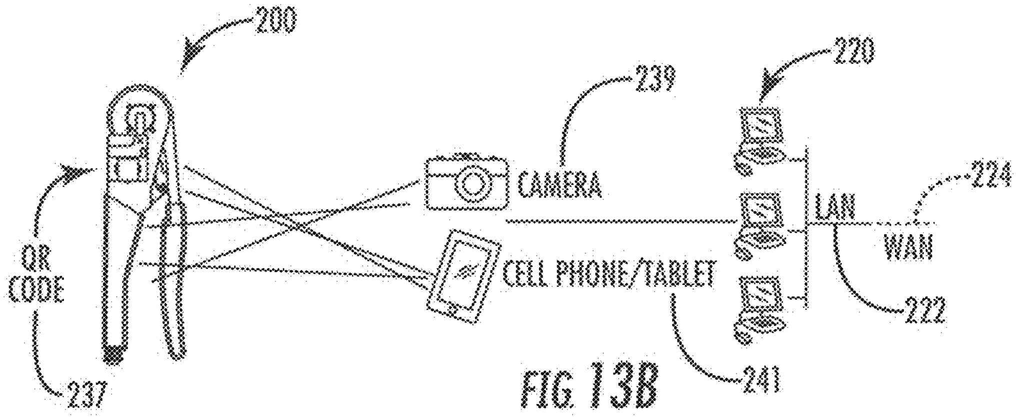
FIG. 13B is a schematic of a crimp tool calibration system of FIG. 12 having a QR code.

When the compatible crimp tool 200 and the positioner 208 are mated and latched, digital communication begins between internal and external databases which retrieve data, monitor, and control the setup of the crimp tool 200 and the positioner 208 as shown in FIGS. 12 and 13A. The use of the crimp tool 200 and positioner 208 can be logged into a production or maintenance control system, and traceable records are recorded. Communication with the network can be accomplished via wire 212 as shown in in FIG. 12, or wireless communications as shown in FIG. 13A (selected during setup) as described below. In addition, as shown in FIG. 13B, a camera 239 or any other image capturing device such as a cell phone/pad device 241 can also read information from a patterned label/stamp 237 such as a QR code 243 to gather data and inform the user of correct usage of the tool and the required accessories for a job such as a wire harness, for example.

In a particular aspect, the controlling computer 214 can be external when the crimp tool 200 and positioner 208 are used for production or wire harness manufacturing applications.

However, when the crimp tool 200 and positioner 208 are used for maintenance or low volume remote use, a crimp tool 200 with an internal controlling computer with display (monitor) 205 may be preferred for portability, and can be made available by the manufacturer.

Figure 22:
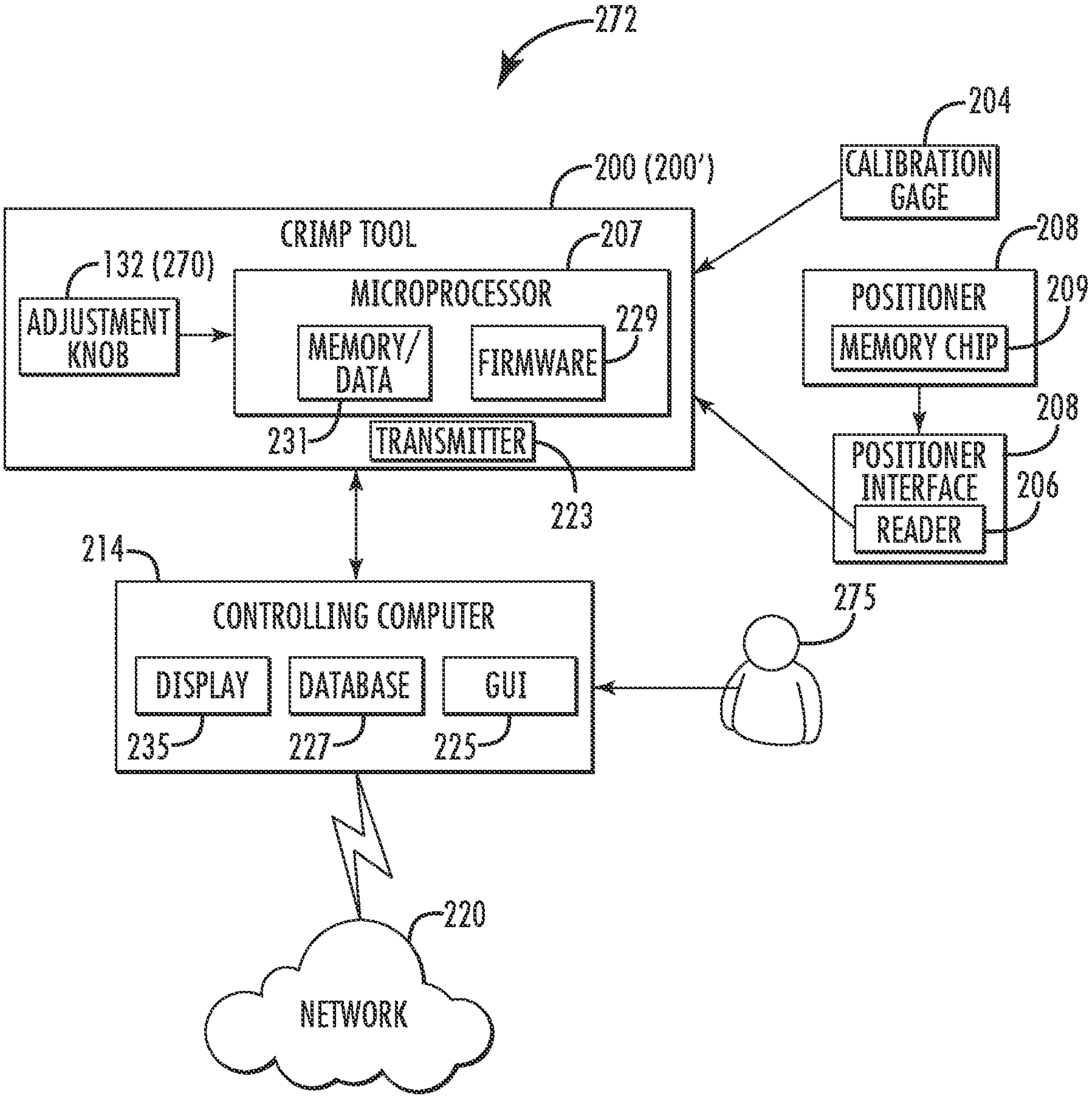
FIG. 22 is a block diagram of a crimp tool calibration system in which various aspects of the disclosure may be implemented.

A display on the controlling computer 214 will indicate the connection when the crimp tool 200 is turned on (by a switch) and a positioner 208 is installed and latched onto the crimp tool 200. The internal read only data in the memory chip 209 of the positioner 208, and firmware 229 (see FIG. 22) stored by the crimp tool microprocessor 207 of the compatible crimp tool 200 will communicate and verify the compatibility and condition of the crimp tool 200 and positioner 208.

The total number of crimp operations (or cycles) since the last self-calibration operation is stored in memory 231 of the crimp tool microprocessor 207, and is registered and displayed on the controlling computer 214. The positioner 208 will, identify itself to the controlling computer 214 with its part number, and the database which corresponds to that part number will fill the user screen on the controlling computer 214 with information (based on setup choices made by the user) as shown in FIG. 14. This will include all the contact part numbers which are assigned to that positioner 208, contact manufacturer name, military or standard number reference, wire/cable information, and notes or process references.

The crimp tool 208 may be fitted with three buttons 236, 238, 240 or touch screen sensors on the controlling computer monitor (depending on equipment used, and setup choices made by the user) as shown in FIG. 14. When the top button/sensor 236 is actuated, the display menu 230 will scroll the list of contact part numbers 232 up. When the lower button/sensor 238 is activated, the display menu 230 will scroll the contact information 232 down. When the correct contact part number is aligned with a window or some alignment indicator, the center button/sensor 240 can be activated to select the contact part number which is in position.

When the contact part number is selected, the stored digital memory will open the data that pertains to that contact (wire size and crimp depth settings) and display it on the controlling computer 214. A wire size/part number menu 234 will open on the display as shown in FIG. 14, and the wire can be selected by scrolling up or down with the button/sensor pad (previously used to select the contact part number).

The part number 252 and wire size 254 selected will move to a designated minor position on the display 250, at which time, the display 250 will show a graphic which has a circle 260 in the center with an up-arrow 258 on one side and a down-arrow 256 on the other side as shown in FIG. 15A.

Based on the selection of the contact and wire size/type, the predetermined crimp depth setting for the crimp tool frame, contact, and wire size is determined by the controlling computer 214, if the actual setting as it is currently adjusted is inappropriate for the selected wire size and contact, it will illuminate the circle 260 in the center of the display red, and it will blink either the up-arrow 258, or the down-arrow 256 to indicate to the operator/user which direction to turn the adjustment knob 132 on the crimp tool 200.

If the up-arrow 258 is blinking, it indicates the adjustment knob 132 requires turning in a direction that makes the crimp depth larger in diameter. If the down-arrow 256 is blinking, it indicates the adjustment knob 132 should be rotated in the opposite direction to decrease the crimp depth. As the correct position nears, an indication is generated for alerting the user. For example, the indicator may be the circle 260 is red and will begin blinking or changing color, indicating to the operator/user to slow down. When the setting is correct for the wire/contact application, the circle 260 will turn green, and an audible signal is activated, for example. As those of ordinary skill in the art, the indication can be visual, aural, haptic, etc., for example.

During crimping operations, the internal electronics will be updating and refreshing the position indicators and other sensors, and if a change in crimp depth selector adjustment occurs (someone intentionally or inadvertently changes the setting), the crimp tool 200 is overstressed, or a shock due to dropping occurs, an alarm is activated in the crimp tool 200, an indication will appear on the controlling computer 214, and the number of suspect terminations is recorded into the database.

The adjustment knob 132 may include a movement sensor 233 (see FIG. 9A) such as a precision potentiometer which will change resistance in very small mechanical increments. As can be appreciated by those of ordinary skill in the art, other sensors to sense mechanical movement may also include optical sensors, capacitive sensors, and/or magnetic, sensors. When the crimp tool power switch is turned on, the movement sensor 233 is read/monitored by the internal microprocessor 207 and firmware 229 in the crimp tool 200. The microprocessor is configured to refresh frequently, and any change in setting is held in the database, and dealt with in accordance with setup screen choices made by the technician.

A battery condition of the crimp tool 200 will also be monitored by the crimp tool microprocessor 207 and firmware 229, and change is indicated to the technician when it is necessary should the crimp tool 200 be battery powered.

A function is programmed into the positioner 208, the crimp tool 200, and the controlling computer 214 so that the technician can select and display the gaging dimension in either inch or millimeter, for example.

Figure 16:
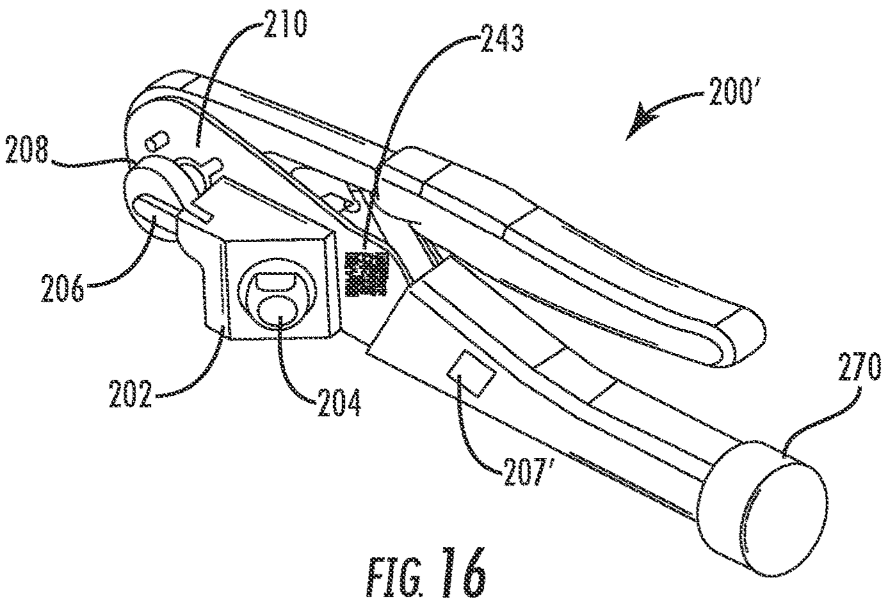
FIG. 16 is a perspective view of a motorized crimp tool in accordance with the invention.

The positioner 208 is also configured to be mounted to a compatible motorized adjustment crimp tool 200' shown in FIG. 16. The motorized adjustment crimp tool 200' may be fitted with an automatic adjustment unit 270 that may include a precision actuator or a stepper motor, for example, a control circuit, and specialized software to perform the crimp depth adjustments under the control of the positioner 208, the crimp tool microprocessor 207, and the controlling computer 214.

When the positioner 208 is coupled to a motorized crimp tool 200', relevant information and a configuration is stored in the crimp tool memory 231 of the microprocessor 207' that identifies (to the controlling computer 214) the type of crimp tool to which the positioner 208 is attached. The database having the internal firmware will reset the software accordingly.

When the technician selects tare contact part number and the wire size using the same process described previously for the operation of the positioner 208 and the manual crimp tool 200, the automated adjustment unit 270 in the motorized crimp tool 200' will actuate the stepper motor to turn the adjustment knob 132 in the needed direction, and stop it precisely at the place where the correct crimp depth will occur.

In operation, the crimp tool 200 will identify itself to the controlling computer 214 with the crimp tool part number, type, serial number, and other types of identification data, based on setup screen choices. This identification data is acknowledged and maintained in the master database. The crimp tool 200 is configured with a crimp cycle counter system that may include a permanent magnet in the crimp tool handle or some location in the crimp tool closing mechanism. The magnet will pass a magnet activated sensor (such as a reed switch) each time the crimp tool cycles. As can be appreciated by those of ordinary skill in the art, any sensor that can tally a count could be used such as an optical switch or the contacts of an electrical switch. The total number of crimp duty cycles (one closing and opening of the crimp tool) is counted and retained in the database.

The crimp tool 200 may also be equipped with a crimp force sensor(s) which will sense the relative force required to close the crimp tool handle, or powered closure mechanism for a powered crimp tool 201 as shown in FIG. 9B via a connection 221 to a power source. When this feature is present in the crimp tool 200, the force is recorded, and the data is used to indicate whether the cycle was under load or not. It may also be used to indicate if the crimp tool 200 was overstressed (indicating that it was used improperly or used to crimp something other than the intended contact). This closing force sensing feature may also be used to indicate operator imposed defects.

General use for the closing force sensing function of the crimp tool 200 such as to detect if the crimp tool crimped a contact or was cycled without a contact, and to sense an overstressed application of the crimp tool can be accomplished with low accuracy strain gages.

Setup choices will allow the crimp tool 200 to be managed appropriately. For instance, the technician can decide to gage every desired number of cycles, and the crimp tool will indicate to the technician when that number has been reached. The user 275 can decide to gage older, high cycle tools more frequently, and many other choices are available to the technician, and controlled by setup screen choices made by the technician.

When it is determined that the crimp tool 200 is required to be calibrated due to the number of crimp operations or otherwise, an indicator is generated that may be an audible, visual, and/or haptic signal, for example, on the controlling computer 214 or crimp tool 200, and normal crimping operations will cease until the calibration is complete.

Figure 17:
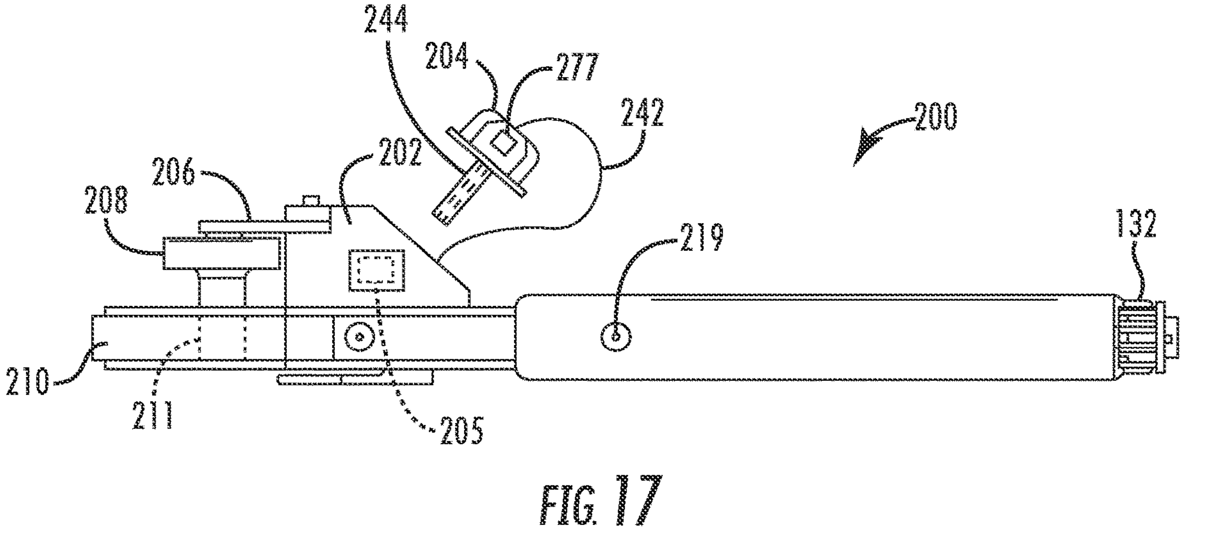
FIG. 17 is a top view of the crimp tool of FIG. 9A having a calibration gage removed.

The technician is instructed to unlatch a calibration gage 204 as illustrated in FIG. 17 from its storage holder on the positioner interface 202 of the crimp tool 200. A gage pin 244 of the calibration gage 204 is inserted and latched into the receiving port 211 on the head 210 of the crimp tool 200, on the side of the crimp tool opposite to the positioner 208. The positioner 208 need not be removed. A wire 242 may be attached to the calibration gage 204 and may extend and retract as needed from the positioner interface 202. The wire 242 also keeps the calibration gage 204 with the crimp tool 200 for which it was designed. The calibration gage 204 may also include a microprocessor 277 that includes memory for storing and reading data and firmware.

The technician is instructed to close the crimp tool handle or close the mechanism actuation (powered crimp tools) prior to inserting the gage pin 244 into the receiving port 211. This will allow the tool indenters to be retracted to a position where gage damage is least likely.

Figure 18:
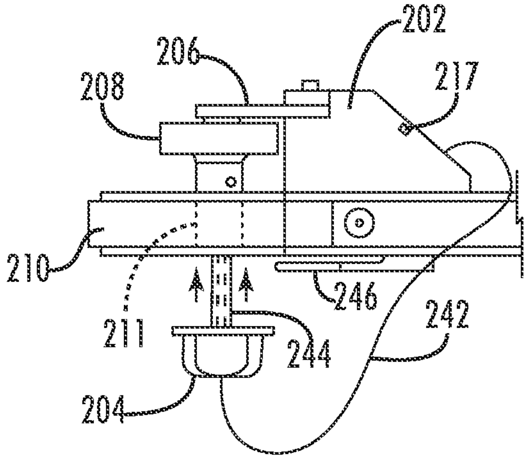
FIG. 18 is a detailed view of the calibration gage of FIG. 17 being positioned for use.

Referring now to FIGS. 17 and 18, the crimp tool 200 with the calibration gage 204 is ready to insert/latch into the receiving port 211 where it is used for calibration gage verification.

Figure 19:
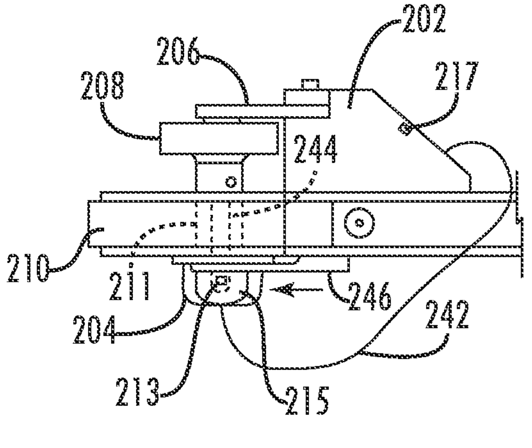
FIG. 19 is a detailed view of the calibration, gage of FIG. 17 placed within a receiving port of the crimp tool of FIG. 9A or 9B.

When the calibration gage 204 is latched into the receiving port 211 using latch 246, as illustrated in FIG. 19, the gage pin 244 will extend into the center of the indent cavity to a location between the crimping dies. The receiving port 211 is configured so the gate pin 244 is central to the crimp tool crimping dies, and the gage pin 244 is oriented radially to a position where the crimping dies align with conductive segments 248*a*, 248*b*, 248*c*, 248*d* of the gage pin 244 (see FIGS. 20-21).

If the indent gap in the crimp tool 200 is set to a diameter smaller than the gage pin 244, the calibration gage 204 will still latch into place, but the gage pin 244 will compress into the gage handle 215 under light spring pressure, for example, so as not to be damaged, or damage the crimping dies. A switch 213 in the gage handle 215, as shown in FIG. 19, is configured to sense the compressed position of the gage pin 244, and causes instructions to be generated for the user to slowly adjust the crimp tool 200 using the adjustment knob 132 in the direction that will open the crimping dies, and allow the gage pin 244 to enter the indent cavity.

The gage pin 244 of the calibration gage 204 has a precise diameter and length which acts as a reference diameter. When the gage pin 244 is installed into the receiving port 211, the user is instructed by the controlling computer 214 to adjust the crimp tool using the adjustment knob 132 to a position where each of four indenters, for example, lightly touch the gage pin 244. They will be acknowledged by electrical continuity between each crimping die and the corresponding elongated conductive segment 248*a*, 248*b*, 248*c*, 248*d*.

Figure 21A:
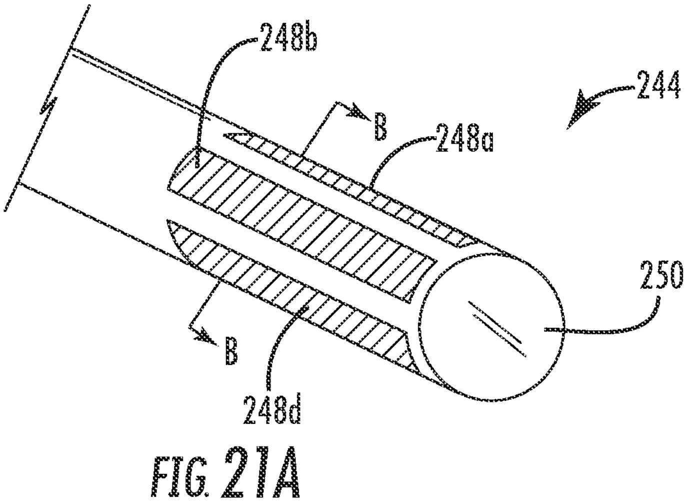
FIG. 21A is a detailed view of the gage pin of FIG. 20.
Figure 21B:
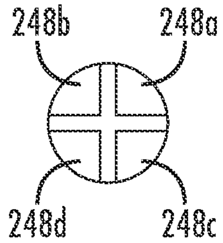
FIG. 21B is a cross sectional view of the gage pin of FIG. 21A taken in the direction of line B-B.
Figure 21C:
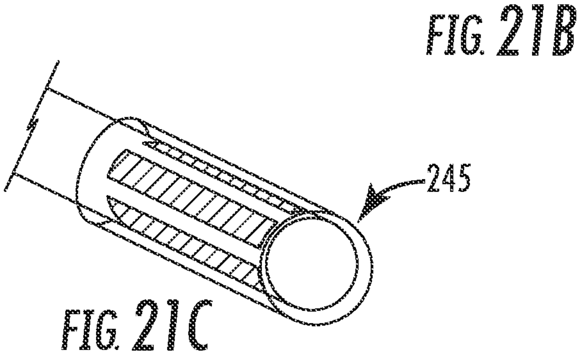
FIG. 21C is a schematic of the gage pin having an insulator sleeve.

In another aspect, an insulating sleeve 245 can be placed over the conductive areas (248*a*, 248*b*, 248*c*, 248*d*), as shown in FIG. 21C, and these areas can then be sensed individually by a capacitive sensor. Very small variances of distance and dimensions can be used to indicate if the crimping dies 118*a*, 118*b*, 118*c*, 118*d* as a whole group are within calibration, or if any particular one has failed or is damaged.

When all four crimping dies 118*a*, 118*b*, 118*c*, 118*d* are lightly touching the respective conductive segments 248*a*, 248*b*, 248*c*, 248*d* (or a different sensing element such as the insulating sleeve 245) and the force is monitored by a strain gage, a precise reference diameter is established, and recorded in the crimp tool memory 231 of the microprocessor 207. This precise diameter setting comprises the datum point, and used as the reference basis for diameters selected by the crimp tool 200 using the adjustment knob 132, which may be motorized 270 or manual.

When the gaging operation is complete, the user is instructed by the controlling computer 214 to unlatch the calibration gage 204 from the receiving port 211, and reinstall it in the positioner interface 202, where it is stored until it is needed for additional gaging operations. A switch/sensor 217 on the positioner interface 202 will activate when the calibration gage 204 is properly stored, and the crimp tool 200 returns to normal crimping operations.

A reset of the calibration cycle count will take place in the microprocessor 207 of the crimp tool 200, and the controlling computer 214 will keep a complete record of the calibration, including the date, operator ID, and Job Code, for example.

The operator is instructed by the controlling computer 214 to reset crimp depth adjustment to the previous setting, and the positioner operation will resume. The controlling computer 214 will verity the positioner ID (part number), and resume data collection for the crimping operations.

The number of crimp duty cycles since the last calibration is kept in active, non-volatile memory 231 of the microprocessor 207 in the crimp tool 200. The controlling computer 214 will manage the cycle count as it relates to calibration of the crimp tool 200.

The gage pin 244 of the calibration gage 204 is configured in a way that it electrically or optically senses when each of the four indenter tips 118*a*, 118*b*, 118*c*, 118*d* (i.e., crimping dies) touch the gage pin 244, and therefore will establish a reference setting which resets the basis of the electronic measuring system internal to the crimp: tool/positioner, and the calibration is confirmed.

Figure 20:
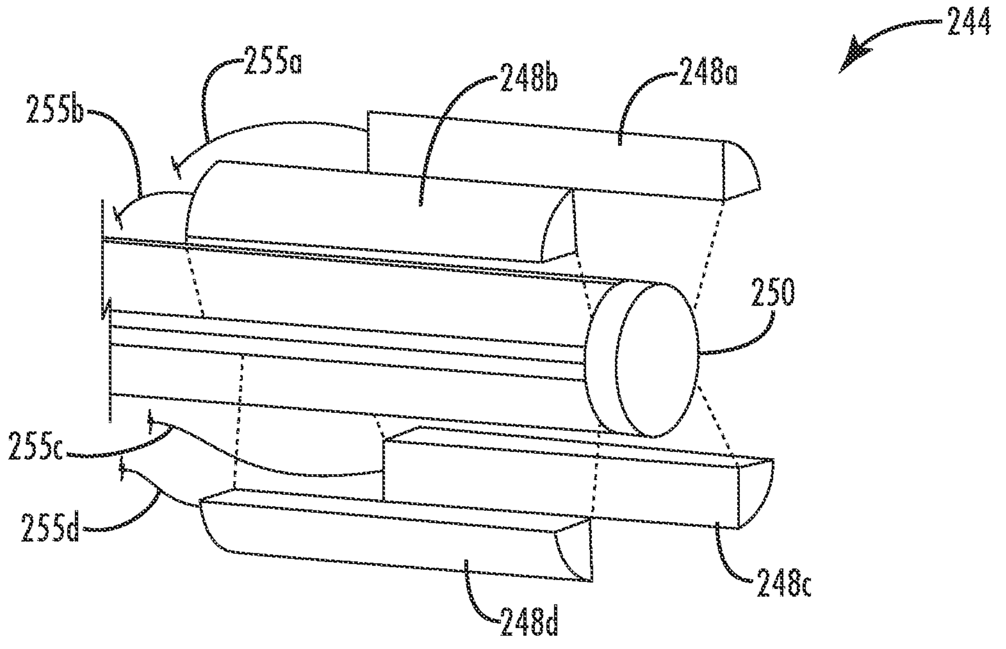
FIG. 20 is an exploded view of a gage pin of the gage of FIG. 17.

Referring now to FIGS. 20 and 21A-21B, the gage pin 244 is divided (by casting or machining) into four elongated conductive segments 248*a*, 248*b*, 248*c*, 248*d*, and bonded to a non-conductive core 250 such as a symmetrical four channel plastic form in the center, for example. Each conductive segment 248*a*, 248*b*, 248*c*, 248*d* is insulated from the other segments, but have metal exposed on the outer diameter. Each conductive segment 248*a*, 248*b*, 248*c*, 248*d* is connected to a wire 255*a*, 255*b*, 255*c*, 255*d*, or circuit board having a conductive path to the microprocessor 207 in the crimp tool 200.

The diameter of the gage pin 244 is closely held to a gage dimension/tolerance. When the crimping dies 118*a*, 118*b*, 118*c*, 118*d* touch the outside diameter of the gage pin 244 having the conductive segments 248*a*, 248*b*, 248*c*, 248*d*, an electrical path (to ground) is established, and allow the microprocessor 207 to sense the position of each crimping die 118*a*, 118*b*, 118*c*, 118*d*.

An alternative configuration for the gage pin 244 comprises a non-conductive core, such as a ceramic rod, with printed segments, and the printing media is conductive and durable to the extent required to support the gaging needs of a production crimp tool.

In operation, the gaging pin 204, and electro-mechanical functions of the crimp tool 200 are measured, tested, and verified on an annual basis, or a schedule that meets the technician experience and environment of the technician.

An advantage of using this system includes that the crimp tool 200 can be used in production or maintenance operations with frequent calibration intervals based on the number of cycles under load the crimp tool 200 has experienced, and at other desired intervals (e.g., annually). The crimp tool and gage diameter/operation can be scheduled for inspection in a well-equipped test lab by experienced and authorized technicians.

Since the system is intended for broad use across various industries, gaging error management in crimp tools is handled differently by various technicians and managers. A graphical user interface ("GUI") 225 is displayed on a display 235 of the controlling computer 214 and is configured the user/managers 275 to select options, and control calibration gaging errors in the appropriate way for their needs (see FIG. 22).

During the set-up of the management, monitoring, and control of the positioners and calibration gages in a user location or across the enterprise, the GUI 225 presents set-up answers/choices to the user which will configure the system across all compatible positioners, calibration gages, and crimp tools in the location or the enterprise.

In a particular aspect, the selections may include the following:

The option to "TAKE NO ACTION" or "TAKE ACTION" when out of gaging errors are found:

If "TAKE NO ACTION" is the choice, the tools in this system will make adjustments (motorized Tools) or instruct the operator to rotate the crimp depth selector knob, and manually adjust the tool (non-motorized tools) back into the correct gaging range.

If "TAKE ACTIONS" is selected the crimp tool will not be automatically adjusted (motorized tools) or give instructions for the operator to adjust it (non-motorized tools). The user is instructed by a message on the display that the tool is to be sent for repair, and the tool is identified as not being eligible for production line use until the repair is performed, and the authorized administrator restores it to useable status.

Whether action is taken or not, a record of the out of gaging condition will become part of the data stored for that crimp tool, and a record of the date and condition(s) is available as a permanent record in the database 227.

When all "tool use" issues are resolved with crimp tool that reported out of gaging, a person with assigned user rights of manager or above can override the gaging error lockout, and restore the crimp tool to normal production use. The crimp tool will self-adjust in the standard way for motorized tools 200', or guide the user through adjustment in the standard way in the case of a manual adjustable crimp tool 200. The override will become part of the database 227.

A gaging error threshold can be elected of 0%, 2%, 5%, for example, or any number that is entered into a setup screen on the GUI 225 (person must have user rights of administrator or above). The selected gaging error threshold can be configured across all tools in a select group, or across all tools enrolled in the user enterprise.

The database 227 which controls the positioner compatible crimp tools is extensive and powerful. It includes assignable lookup functions and access to data beyond the immediate application being used.

In addition, the positioner 208 and the calibration gage 204 may be fitted to manually closed crimp tools 200 (tools with moveable handles closed by human strength), or powered crimp tools 201 (tools which move through the crimp cycle by means of electric, pneumatic, or hydraulic power).

A block diagram of a system 272 in various aspects of the disclosure may be implemented is illustrated. In particular, the system 272 includes the crimp tool 200 (200' for motorized crimp tool) having a microprocessor 207. The microprocessor 207 includes memory 231 (for storing and reading data) and firmware 229. In addition, the crimp tool 200 includes a transmitter 223 for communicating with the controlling computer 214 which may be remote, local or part of the crimp tool 200. As explained above, the crimp tool 200 includes an adjustment knob 132 to adjust the crimp depth. The positioner 208 includes the memory chip 209, which is configured to be read by the reader 206. The reader 206 may be included with the positioner interface 202, which is communication with the microprocessor 207.

The controlling computer 214 is operated by a user 275 using GUI 225. The controlling computer 214 includes a display 235 for the GUI 225 and a database 227 storing data regarding the crimp tool 200 and positioner 208, and also the data used for selecting a correct crimp depth as explained above with respect to FIGS. 14 and 15. The controlling computer 214 may also be in communication with a network 220 (e.g., a cloud service).

Figure 23:
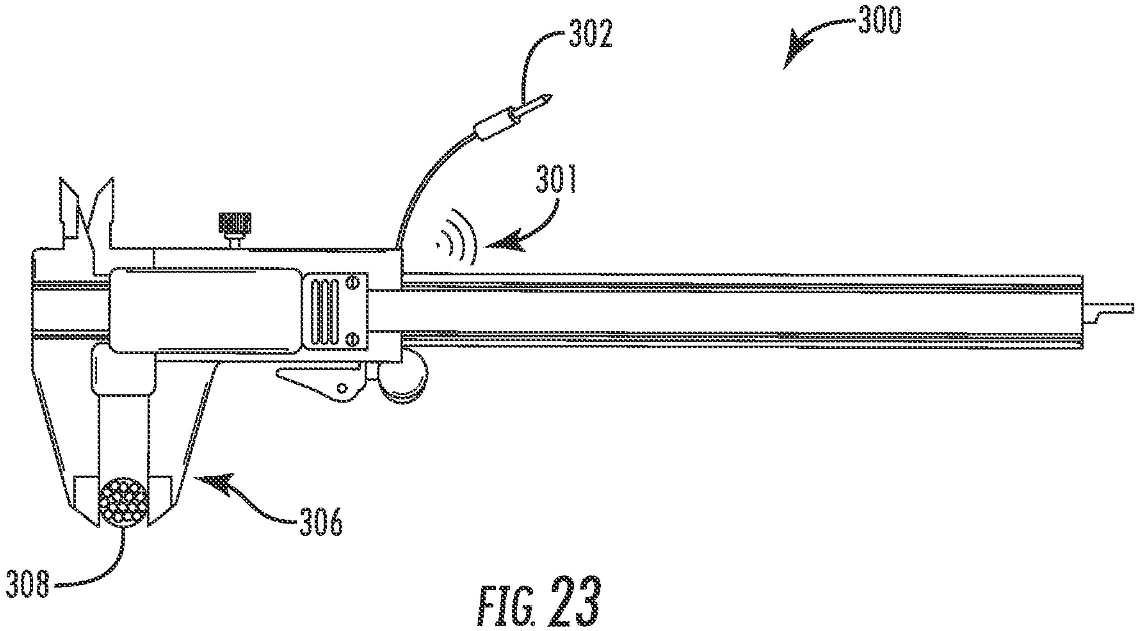
FIG. 23 is a schematic of wire caliper in which various aspects of the disclosure may be implemented.

Often the technician may not know the wire part number or size by the AWG or Metric designation which is selectable through the positioner/wire data. This is a common issue with maintenance use of crimp tools. Accordingly, an optional (wired or wireless) plug-in wire caliper 300 may be used to, automatically select the wire size, and change the crimp tool settings to the appropriate settings for the wire diameter being measured as shown in FIG. 23. In addition, can identify if installed positioner is incorrect for given wire size or selected contacts are incompatible for wire size.

A plug-in jack 219 may conveniently be positioned on the crimp tool 200 so that the wire caliper 300 can be coupled to it using output plug 302. In another particular aspect, the crimp tool 200 is wirelessly 301 coupled to the wire caliper 300. When the contact is selected by the method previously described, the technician is instructed by the GUI 225 to measure the wire 308 by opening the measuring jaws 306 of the wire caliper 300, and closing them under spring pressure on the wire 308 (outside diameter of the stripped bare conductor (preferred) or over the wire insulation jacket). The technician is asked by the GUI 225 if the measurement jaws 306 are affixed to the conductor (metal wire strands) or the insulation (outer covering). The technician will select the appropriate answer by moving up or down and selecting the answer. When that question is answered, the controlling computer 214 will compare the readings (measured diameter) with the database 227, and display the wire size using the GUI 225, and send data to the automatic adjustment unit 270 of a motorized crimping tool 200' which will cause the motor to activate, and move to the correct crimp depth for that contact/wire size combination. If a manually adjusted crimp tool 200 is being used, then information on the controlling computer 214 will activate, and using the GUI 225 instruct the operator to rotate the crimp depth adjustment knob 132 accordingly.

Figure 24:
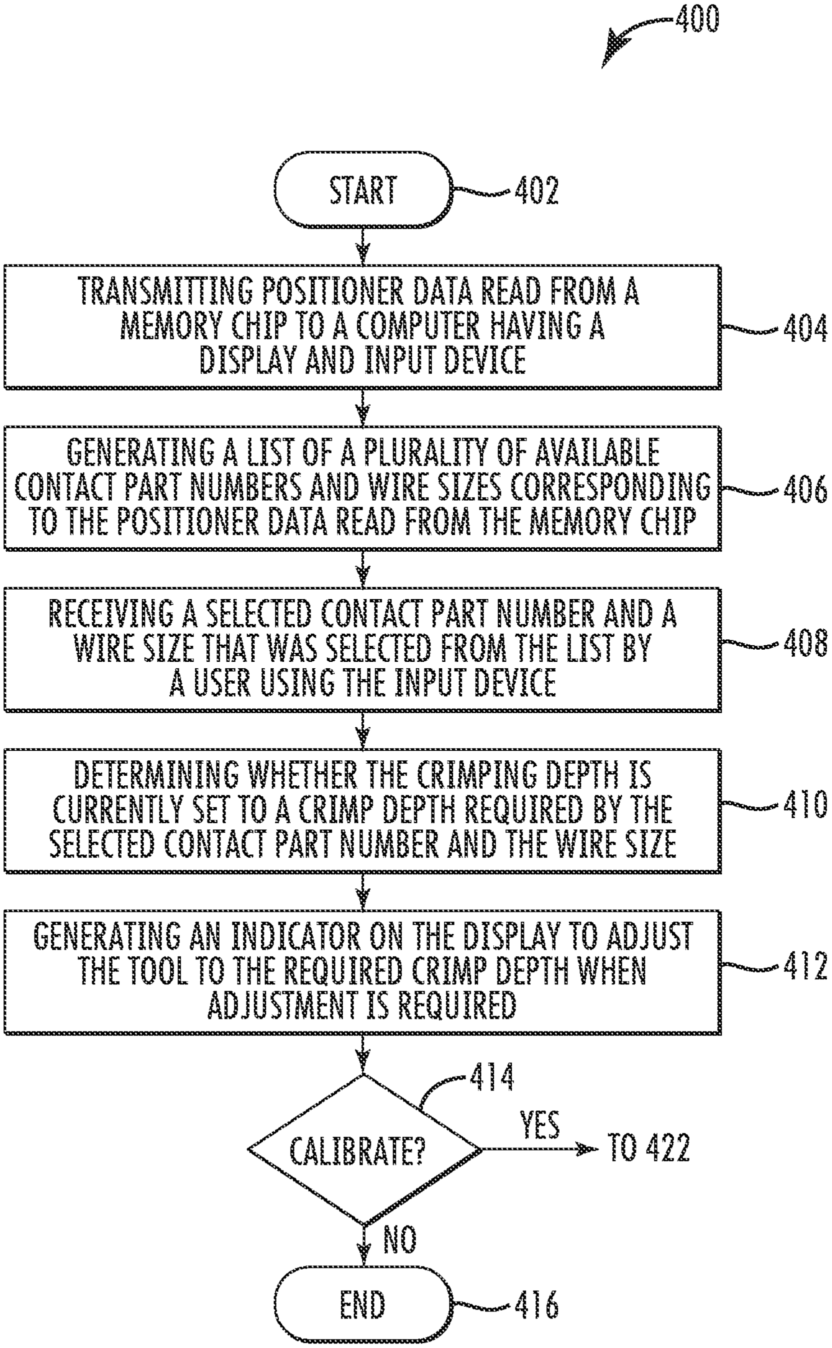
FIG. 24 is a general flowchart of a method of using the crimp tool of FIG. 9A or 9B.
Figure 25:
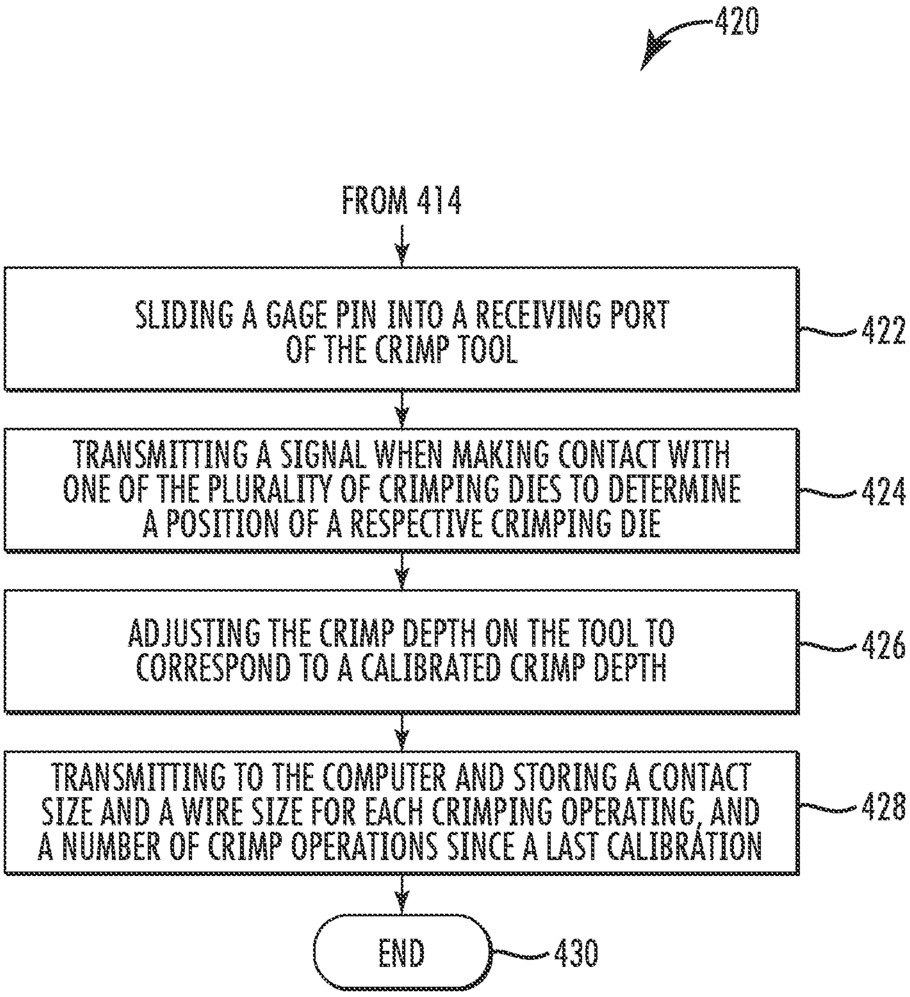
FIG. 25 is a general flowchart of calibrating the crimp tool of FIG. 9A or 9B.

Referring now to the flowchart 400 in FIG. 24, and generally speaking, a method of using the crimp tool illustrated in FIGS. 9A-22 will be discussed. From the start 402, the method includes transmitting positioner data read from a memory chip to a computer having a display and input device, at 404, and, at 406, generating a list of a plurality of available contact part numbers and wire sizes corresponding to the positioner data read from the memory chip. Moving to 408, the method includes receiving a selected contact part number and a wire size that was selected from the list by a user using the input device, and at 410, determining whether the crimping depth is currently set to a crimp depth required by the selected contact part number and the wire size. The method also includes, at 412, generating an indicator on the display to adjust the tool to the required crimp depth when adjustment is required. If the crimp tool needs to be calibrated, at 414, then a method of calibration 420 begins as shown in FIG. 25, otherwise the method ends at 416.

The calibration of the crimp tool begins, at 422, with sliding a gage pin into a receiving port of the crimp tool, where the gage pin comprises a non-conductive core having a plurality of elongated conductive segments thereon and insulated from each other, and transmitting, at 424, a signal when making contact with one of the plurality of crimping dies to determine a position of a respective crimping die. Moving to 426 the method may include adjusting the crimp depth on the tool to correspond to a calibrated crimp depth. In addition, the method may include, at 428, transmitting to the computer and storing a contact size and a wire size for each crimping operating, and a number of crimp operations since a last calibration. The method ends at 430.

Many modifications and other embodiments of the invention will me to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A crimp tool calibration system for crimping a prepared wire into a corresponding contact wire barrel, the crimp tool calibration system comprising:

a computer comprising a processor and a memory coupled to the processor;

a positioner having a memory chip storing positioner data; and a tool frame comprising, a head having a receiving port therethrough, the receiving port having a first end and a second end and configured for the positioner to be removably engaged with the first end of the receiving port during a crimping operation;

a plurality of crimping dies positioned around a periphery of the receiving port;

an adjustment device to adjust a crimp depth of the plurality of crimping dies; and a positioner interface coupled to the tool frame and having a tool memory storing tool data, a reader, and a transmitter, the reader is configured to read the positioner data stored on the memory chip of the positioner, and the transmitter is configured to transmit the positioner data and the tool data to the computer wherein the computer is configured to generate a list of a plurality of available contact part numbers and wire sizes corresponding to the positioner data read from the memory chip, and to receive a selected contact part number and a wire size that was selected from the list by a user using an input device.

2. The crimp tool calibration system of claim 1, wherein the computer is configured to determine whether the crimping depth of the plurality of crimping dies is currently set to a crimp depth required by the selected contact part number and the wire size, and to generate an indicator to the user to adjust the crimping dies to the required crimp depth when adjustment is required.

3. The crimp tool calibration system of claim 1, further comprising a calibration gage having a gage pin, wherein the gage pin is configured to slide into the second end of the receiving port when calibrating the plurality of crimping dies.

4. The crimp tool calibration system of claim 3, wherein the gage pin comprises a non-conductive core having a plurality of elongated conductive segments thereon and insulated from each other.

5. The crimp tool calibration system of claim 4, wherein each of the plurality of conductive segments are in electrical communication with the positioner interface and configured to transmit a signal when contacted by one of the plurality of crimping dies to determine a position of a respective crimping die.

6. The crimp tool calibration system of claim 3, wherein the gage pin comprising a plurality of conductive areas, and an insulating sleeve over the plurality of conductive areas, and the plurality of conductive areas configured to be sensed by a capacitive sensor.

* * * * *